(12) United States Patent
Chien et al.

(10) Patent No.: US 9,376,619 B2
(45) Date of Patent: Jun. 28, 2016

(54) FAST-SWITCHING SURFACE-STABILIZED LIQUID CRYSTAL CELLS

(75) Inventors: Liang-Chy Chien, Hudson, OH (US);
Volodymyr Borshch, Kent, OH (US);
Jeoung-Yeon Hwang, Daejeon (KR)

(73) Assignee: KENT STATE UNIVERSITY, Kent, OH (US)

( * ) Notice: Subject to any disclaimer, the term of this patent is extended or adjusted under 35 U.S.C. 154(b) by 29 days.

(21) Appl. No.: 13/578,316

(22) PCT Filed: Feb. 15, 2011

(86) PCT No.: PCT/US2011/000275
§ 371 (c)(1),
(2), (4) Date: Aug. 10, 2012

(87) PCT Pub. No.: WO2011/102892
PCT Pub. Date: Aug. 25, 2011

(65) Prior Publication Data
US 2013/0027639 A1    Jan. 31, 2013

Related U.S. Application Data (60) Provisional application No. 61/338,380, filed on Feb. 18, 2010.

(51) Int. Cl.
*G02F 1/1333* (2006.01)
*C09K 19/20* (2006.01)
(Continued)

(52) U.S. Cl.
CPC .............. *C09K 19/2007* (2013.01); *C09K 19/02* (2013.01); *G02F 1/133711* (2013.01);
(Continued)

(58) Field of Classification Search
CPC . G02F 1/00; G02F 2001/00; G02F 2001/137; G02F 2001/13712; G02F 2001/13775; G02F 2001/133715; G02F 2001/133726; G02F 1/133711; G02F 1/133707; G02F 2001/133776; G02F 2202/36; C09K 19/00; C09K 19/08; C09K 19/10; C09K 19/12; C09K 19/126; C09K 19/56; C09K 2019/548; C09K 2019/0448; C09K 19/02; C09K 19/2007; Y10T 428/10; Y10T 428/1036; Y10T 428/105; Y10T 428/1023; B32B 2457/202
USPC ............ 428/1.1, 1.3; 349/182, 183, 186, 177, 349/178, 84, 86, 88; 252/299.01, 299.6, 252/299.61–68, 299.7
See application file for complete search history.

(56) References Cited

U.S. PATENT DOCUMENTS 6,727,968 B1    4/2004  Bryan-Brown et al.
7,228,050 B1    6/2007  Buretea et al.
(Continued)

OTHER PUBLICATIONS

Huang et al, Switching of Polymer-Stabilized Vertical Alignment Liquid Crystal Pi Cell-Curing Voltage and Driving Scheme Effects, Japanese Journal of Applied Physics, 48, Feb 5, 2009, pp. 020210-1 to 020210-3.*
Ren et al, Polarization Independent and Fast Response Phase Modulators Using Orthogonally Orientated Liquid Crystal Gels, SID 06 Digest, 2006, pp. 691-693.*
(Continued)

*Primary Examiner* — Gwendolyn Blackwell
*Assistant Examiner* — Eli D Strah
(74) *Attorney, Agent, or Firm* — Hudak, Shunk & Farine Co. LPA (57) ABSTRACT

A surface polymer-assisted vertically aligned (SPA-VA) liquid crystal (LC) cell has a surface alignment layer of surface localized polymer nano spikes capable of controlling the pretilt angle of liquid crystal molecules and ensuring fast switching characteristics. The deposition of the polymer nanospikes as a part of the alignment layer is achieved by polymerizing a small amount of a reactive monomer in vertically aligned liquid crystal with or without an applied voltage. Due to the alignment of liquid crystal molecules by the surface alignment layers, the polymerized polymer acts as an internal surface to modify and control the field-induced reorientation of the liquid crystal molecules. The SPA-VA LC cell realizes a stable alignment and the considerable advantage of the formation of polymer spikes via UV irradiation on both substrates of the cell. Furthermore, the switch-off of a SPA-VA is fast due to the enhanced surface anchoring strength by the surface-localized polymer nano spikes.

15 Claims, 7 Drawing Sheets

(51) Int. Cl.
*C09K 19/02* (2006.01)
*C09K 19/04* (2006.01)
*C09K 19/54* (2006.01)
*G02F 1/1337* (2006.01)

(52) U.S. Cl.
CPC ... *B32B2457/202* (2013.01); *C09K 2019/0448* (2013.01); *C09K 2019/548* (2013.01); *G02F 1/133707* (2013.01); *G02F 2001/133776* (2013.01); *G02F 2202/36* (2013.01); *Y10T 428/10* (2015.01); *Y10T 428/105* (2015.01); *Y10T 428/1023* (2015.01)

(56) References Cited

U.S. PATENT DOCUMENTS

| | | | |
|---|---|---|---|
| 2005/0162585 A1* | 7/2005 | Komitov et al. | 349/88 |
| 2005/0174519 A1* | 8/2005 | Kitson et al. | 349/129 |
| 2007/0042134 A1* | 2/2007 | Kao et al. | 428/1.1 |
| 2007/0170394 A1 | 7/2007 | Kawamura et al. | |
| 2007/0269613 A1* | 11/2007 | Chien et al. | 428/1.1 |
| 2008/0094551 A1* | 4/2008 | Hayashi | G02F 1/13475 349/106 |
| 2008/0266503 A1* | 10/2008 | Lyu | 349/124 |
| 2009/0141215 A1* | 6/2009 | Bremer et al. | 349/86 |
| 2009/0152772 A1 | 6/2009 | Komitov et al. | |

OTHER PUBLICATIONS

Baek et al, Fast Switching of Vertical Alignment Liquid Crystal Cells with Liquid Crystalline Polymer Networks, Japanese Journal of Applied Physics, 48, May 2009, pp. 056507-1 to 056507-5.*
Huang et al, Switching of polymer-stabilized vertical alignment liquid crystal cell, Optics Express, vol. 16 No. 6, Mar. 2008, pp. 3859-3864.*
Lee, You-Jin et al., Surface-controlled patterned vertical alignment mode with reactive mesogen, Jun. 4, 2009, Optics Express, vol. 17, No. 12, pp. 10298-10303.*
Kim, S.H, et al., Electro-optical Devices from Polymer-Stabilized Molecular Shape Polarity of a Cholesteric Liquid Crystal, SID Digest, 35, pp. 622-625 (2004).
Kim, S.H., et al., Short Pitch Cholesteric Electro-Optical Device Stabilized by Nonuniform Polymer Network, Appl. Phys. Lett., 86, pp. 161118 (2005).
Takatsu, H., et al., Development of Advanced Liquid Crystal Materials, Proceedings of Int. Dis. Res. Conf. IDRC 08 Digest, pp. 29-32 (2008).
Bremer, M., et al., Novel Liquid-Crystal Materials with Negative Dielectric Anisotropy for TV Application, Journal of the SID, 14, pp. 514-521 (2006).
Wittek, M., et al., Advanced LC Materials for Ultra-Fast Switching for Active-Matrix-Device (AMD) Applications, Proceedings of Int. Disp. Res. Conf. IDRC, 08 Digest, pp. 253-255 (2008).

* cited by examiner

FAST-SWITCHING SURFACE-STABILIZED LIQUID CRYSTAL CELLS

FIELD OF THE INVENTION

The present invention relates to liquid crystal cells, which are fast switching surface-polymer-assisted vertically aligned (SPA-VA) liquid crystal cell, to methods of making the cells and to displays (LCDs) that incorporate these liquid crystals. The invention achieves fast switching by utilizing polymer nanospikes or nanorods at the alignment layer surface. The formation of polymer nanospikes as the alignment layers at both substrate surfaces is achieved by liquid crystal (LC) directed polymerization of a small amount of a reactive monomer in vertically aligned liquid crystal. At appropriate concentration, the phase-separated polymer facilitates the fast switching of liquid crystal molecules.

BACKGROUND OF THE INVENTION

Recent advances in technical issues including poor viewing angle and color definition have been addressed to an acceptable level for liquid crystal displays (LCDs) in mobile devices, monitors and television sets; however, the picture blur of LCDs using a nematic liquid crystal is an issue since the response time of LCD's using a nematic liquid crystal is still insufficiently fast for displaying motion picture quality images. To achieve fast response speed in a LCD, one method is to improve the performance of liquid crystal materials and the other is to improve the device configuration of liquid crystal displays. Several ideas based on modification of device configuration have been developed with the aim of improving the response time including the increase in frame rate. In past decades, several advanced liquid crystal display modes and methods have been developed to solve the viewing angle, for example, in-plane switching (IPS), fringe field switching (FFS), multi-domain vertical alignment (MVA) and patterned vertical alignment (PVA). Recently, through advanced addressing, methods such as scanning backlight, higher-frequency driving and black stripe insertion, LCDs with improved response speed are reported.

In the vertically-aligned (VA) system, the LC molecules are aligned perpendicular to the substrates in the absence of field, thus producing a black image. In this state the polarized light passes through the cell without interruption from the LC molecules and is blocked by the front polarizer. Because there is no twisted structure, the LC molecules are simply switched between vertical and horizontal alignments with a fast response speed. When a voltage is applied across the cell, the nematic LC molecules shift to a horizontal position, producing a white image. The optical transmittance of the vertically aligned nematic LC layer between crossed polarizers can be given as $T=\sin^2(2\phi(V))\sin^2(\pi d\Delta n(V)/\lambda)$ where $2\phi(V)$ voltage dependent azimuthal component of the angle between the LC optic axis and the transmission axes of the crossed polarizes and $\pi d\Delta n(V)$ is voltage dependent retardation of the LC layer (where $\delta$ is the thickness of LC layer, $\Delta n$ is the birefringence value of LC layer) and l is the wavelength of incident light. With an applied voltage, the vertically aligned LC molecules are switched in a direction parallel to substrates making condition of $2\phi(V)=\pi/4$ and $(\pi d\Delta n(V)/\lambda)=\pi/2$ to maximize the light transmittance, that is T=1. The new multi domain VA modes produce displays with an ultra-high optical contrast between the bright and dark states and wide angle view because the blockage of light transmission is complete at the filed-off state and the viewer see this black from all viewing angles. The switching times of turn-on (rise, $\tau_{on}$) and turn-off (decay, $\tau_{off}$) can be described by the following equations: $\tau_{on}=(\gamma_1 d^2/\pi K_{eff})(1/V/V_{th})^2-1)]$ and where $\tau_{off}=(\gamma_1 d^2/\pi K_{eff})$, where $\gamma_1$ is the rotational viscosity of LC molecule, $K_{eff}$ is the effective elastic constant (for VA, the $K_{eff}$ is equal to $K_{33}$) and V and $V_{th}$ are the applied voltage and threshold voltage, respectively. Due to the weak surface anchoring slow decay time it is insufficient for the above mention VA LCDs to display motion picture quality images.

Simultaneously, various efforts have been carried out to improve the response time of a nematic type LCD based on the development of advanced liquid crystal (LC) material. Further improvements have been reported for LC materials using mixtures with lower viscosity in order to reduce the switching times smaller than one frame time (16 msec); yet, this is still not sufficient to realize motion pictures in a LCD TV, due to the striking difference between cathode-ray-tube (CRT) TV (the so-called impulse driving) and LCD TV (the so-called hold type driving). The hold-type driving scheme of the LCD TV still causes blurring of images even in the theoretical case where the pixels switching voltage is zero.

Incorporating a small amount of polymer network in a liquid crystal to provide the ability of stabilization or modification of the reorientation of LC director in response to applied electric field has been reported by S. H. Kim, L. C. Chien, and L. Komitov, *Electro-optical Devices from Polymer-stabilized Molecular Shape Polarity of a Cholesteric Liquid Crystal*, SID Digest, 35, 622-625 (2004), S. H. Kim, L. Komitov, L. C. Chien, *Short pitch cholesteric electro-optical device stabilized by nonuniform polymer network*, Appl. Phys. Lett., 86, 161118 (2005), H. Takatsu, S. Kawakami, G. Sudo, T. Kusumoto, Y. Nagashima, M. Negishi, and T. Matsumoto, *Development of Advanced Liquid Crystal Materials*, Proceedings of Int. Disp. Res. Conf. IDRC 08 Digest, pp. 29-32 (2008) and M. Bremer, M. Klasen-Memmer, D. Pauluth, K. Tarumi, *Novel liquid-crystal materials with negative dielectric anisotropy for TV application*, Journal of the SID 14, pp. 514-521 (2006). Additionally, the literature describes a fast switching electro-optical device using an advanced polymer stabilization method where the LC directors are oriented with a surface localized polymer, (M. Wittek, S.-E. Lee, H.-K. Lee, M. Bremer, H. Hirschmann, V. Reiffenrath, B. Rieger, *Advanced LC Materials for Ultra-Fast Switching for Active-Matrix-Device (AMD) Applications*, Proceedings of Int. Disp. Res. Conf. IDRC 08 Digest, pp. 253-255 (2008)). This device comprised a small amount of a reactive monomer, photoinitiator and liquid crystal mixture; the mixture being filled in a liquid crystal cell with appropriate alignment. Under applied voltage to obtain desired LC alignment, the cell was exposed to ultraviolet (UV) light to polymerize the reactive monomer to obtain a surface localized polymer at both substrates. A similar approach, i.e., a polymer sustained alignment (PSA) was reported in 2004 to improve the light leakage of a MVA mode to obtain high contrast ratio LCDs; however, the need to use an applied voltage to achieve desired polymer protrusion, makes the method cumbersome for manufacturing. Combining both new pixel electrode pattern design and new cell process based on PSA technology, the liquid crystal molecules could well be aligned without protrusion and without ITO slit, resulting in a display with super high static contrast ratio, fast response time and low color washout.

To obtain surface localized polymers with the desired pretilt angle without the need to apply an electric filed during the formation of the polymer, the present invention involves a novel method of forming nano polymer spikes or rods at the substrate surfaces for VA LCDs. Thus, the LCD device of the present invention comprises and liquid crystal cell including a small amount of highly localized surface located polymer, advantageously on both substrates. This polymer is formed on the substrate surfaces as nanospikes or nanorods. In order to obtain these surface localized polymer nanospikes or nanorods with the desired pretilt angle, without the trade off in light transmittance, this invention presents a new method in preparation of surface-polymer-assisted VA LCDs.

The present invention in particular is of advantage in use in In-Plane Switching (IPS), one of the most leading LCD technologies in the world. IPS technology innovatively aligns liquid crystal horizontally to increase the viewing angle and changes the LCD transmittance. This technology was unanimously accepted in its early phase by professionals from all across the globe and was one of the first refinements to produce significant gains in the light-transmissive characteristics in iPad panels. It is a technology that addresses the two main issues of a standard twisted nematic (TN) TFT display color and viewing angle.

In the IPS system, the liquid crystal (LC) molecules are aligned horizontally with an angle of around 12 degree with respect to the electrodes. In this way, the LC molecules are kept parallel to the electrode pair, and thus the glass substrate of the screen. In the absent of field, the LC molecules are aligned parallel to one of the crossed polarizers thus producing a black image. In this state the polarized light passes through the cell without interruption from the LC molecules and is blocked by the front polarizer.

To produce an image, a voltage is applied across the electrodes where the nematic LC molecules are reoriented at an angle to align between the electrodes, normally at 45 degree between crossed polarizers. The electrical field is applied between each end of the crystal molecules—termed a "lateral electric field." The liquid crystal molecules are weakly anchored to the lower glass substrate, so move more freely into the desired alignment. Because there is no twisted structure the LC molecules are simply switched between dark and bright states in the plane with a fast response speed. IPS improves viewing angles of TFT monitors considerably compared to the TN LCDs due to its character of symmetrical optical retardation at all angle.

Since its introduction in 1996 IPS has gone through a number of advances, with the evolution of Super IPS, Advanced Super IPS, and IPS-Pro. Super IPS was introduced in 1998 to combat the color shift that was still apparent in wide angles of the original IPS screens. With AS-IPS the breakthrough was to move from opaque to transparent electrodes, considerably reducing the amount of power required for an IPS backlight. Also notice the transition to more smooth pixels, giving a cleaner, crisper more continuous image at all angles. IPS-Pro is highly advanced and very expensive, only used in industrial settings where image clarity on a screen is considered critical. Commonly IPS-Pro is used in medical settings, particularly in surgery, but there are other uses in advanced engineering and science that benefit from the clarity and precision of IPS-Pro.

SUMMARY OF THE INVENTION

In view of the above, it is an object of the present invention to provide a surface-polymer-assisted vertically aligned (SPA-VA) liquid crystal cell having a highly localized vertical alignment polymer of a particular configuration. Specifically, this alignment structure is presented at the surface as nano-spikes or nanorods. The invention further relates to methods of forming the liquid crystal cells in which the polymer nano-spikes are formed at both substrate surfaces by liquid crystal (LC) directed polymerization of a small amount of a reactive monomer in vertically aligned liquid crystal. Further the invention relates to a fast switching liquid crystal cell which utilizes the surface-polymer vertically aligned nano-structures to improve switching times, and to devices, such as liquid crystal displays that incorporate this novel liquid crystal cell. Additionally, the invention relates to the achievement of significant improvement in response time, and in particular to fall time, by controlling the density of nano-spikes which give rise to the enhancement in liquid crystal surface anchoring. These polymerized VA cells also show fast switching and high transmittance with an applied electric field.

Yet another object is to provide an liquid crystal cell in which polymerized polymer nano-spikes are obtained due to an alignment of LC molecules by surface alignment layers using a nematic LC with a negative dielectric anisotropy and a fixed low concentration of a reactive monomer (RM). The polymerized polymer nano-spikes or nano-rods copy the orientation of the host, and act as internal surfaces to modify and control the filed-induced reorientation of the host LC molecules. Thus, an additional object of the invention is to provide polymer assisted vertically aligned liquid crystals which display improvements in decay time, and response to result in devices having improved motion picture quality images.

DETAILED DESCRIPTION OF THE INVENTION

The invention further relates to liquid crystal cells and methods of forming the liquid crystal cells in which the polymer nanospikes are formed at both substrate surfaces by liquid crystal (LC) directed polymerization of a small amount of a reactive monomer in vertically aligned liquid crystal. These nanospikes are capable of controlling the pre-tilt angle of the liquid crystal molecules and promoting fast switching characteristics. The polymers nanospikes are deposited by polymerizing a small amount of reactive monomer in a vertically aligned liquid crystal with or without applied voltage. These nanospikes act as an internal surface to modify and control the filed-induced reorientation of the liquid crystal molecules. Advantageously, both sides of the liquid crystal cell are irradiated with a specifically controlled length and wavelength of ultra-violet (UV) radiation in order to cause the desired polymer nanospikes to form.

In accordance with the invention, a nematic LC, ZLI-4788-000, with a negative dielectric anisotropy (−5.7) and a fixed amount of a reactive monomer (RM257) were prepared and filled in VA cell with cell gap of from 3.5 to 3.6 μm with vertical surface alignment layers. Four different methods of UV exposure were explored: (a) on both sides of a cell, (b) on a single side of a cell with a reflector, (c) on both sides of a cell simultaneous with dual UV lamps, and (d) on a single side of a cell with a reflector with a UV light source and with applied field. The electro-optical properties of these cells were studied and reported with in-house developed optical measurement software.

A nematic LC ZLI-4788-000 with a negative dielectric anisotropy (−5.7) and a fixed amount of a reactive monomer (RM257) were prepared and filled in VA cell with cell gap of 3.8 μm with vertical surface alignment layers. Four different methods of UV exposure were explored: (a) on both sides of a cell, (b) on a single side of a cell with a reflector, (c) on both sides of a cell simultaneous with dual UV lamps, and (d) on a single side of a cell with a reflector with a UV light source and with applied field. The electro-optical properties of these cells were studied and reported with in-house developed optical measurement software.

Figure 1A:
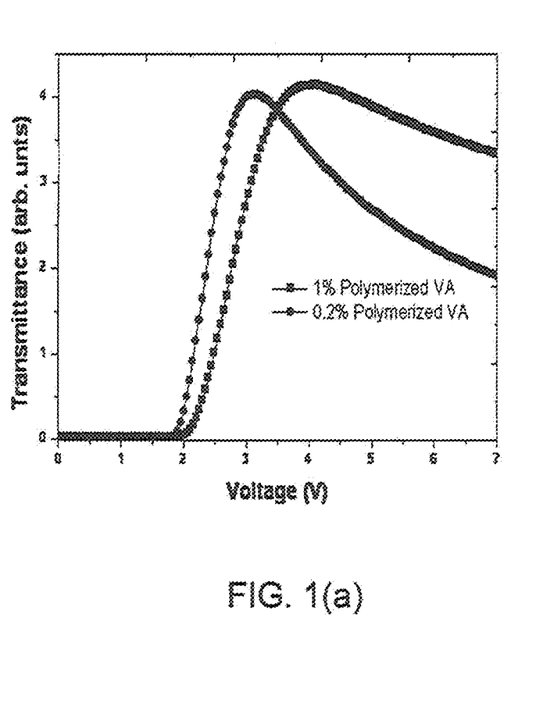
FIG. 1(a) Transmittance versus applied voltage curves for two samples prepared by single side UV exposure with a reflector and (b) the rise (RI) and decay (DE) times of the corresponding samples.
Figure 1B:
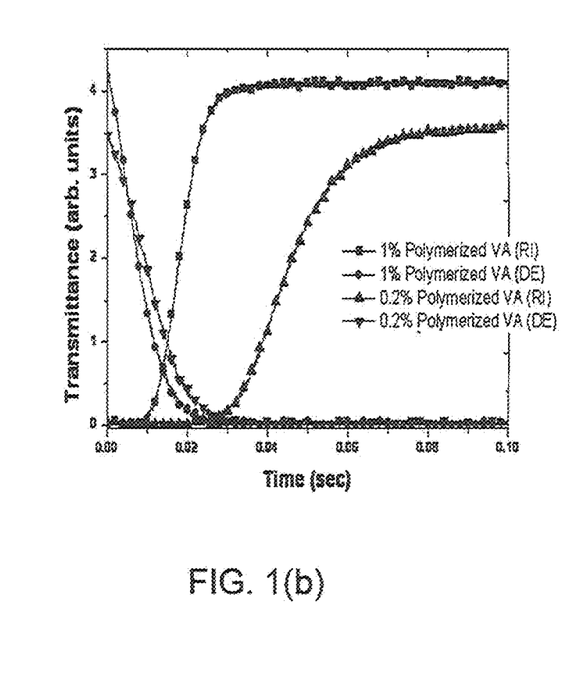

FIG. 1a shows the transmittance curves versus applied voltage for two samples with 0.2% and 1.0% of polymer localized at the surface of the cell substrates. FIG. 1a shows the transmittance-voltage curves of the mixture of polymerized VA cells containing liquid crystal with 0.2% and 1.0% polymer. In case of the 1% polymerized VA cell, it shows slightly increase in threshold and maximum transmission voltages. FIG. 1b shows the transmittance versus switching time of the 0.2% and 1% sample. Compared with the response time of the pure VA liquid crystal 52 ms (rise=36 ms, decay=16 ms), 1% polymer sample shows 40% improvement in response time; however, the improvements mainly arise from the reduction in rise time.

Strikingly, 0.2% polymer sample shows negligible improvement in response time. This experiment was reproduced with a dual lamp exposure method, which shows very similar effect with improvements in rise time.

Figure 2A:
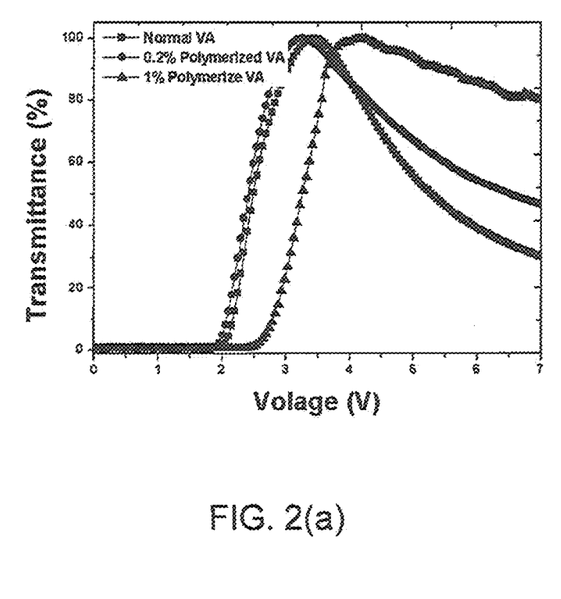
FIG. 2(a) Transmittance versus applied voltage curves for two samples prepared by single side UV exposure with applied electric field and (b) the rise and decay times of the corresponding samples.
Figure 2B:
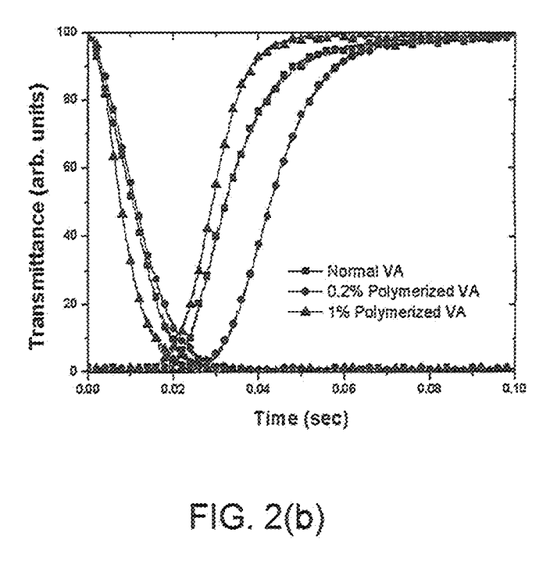

FIG. 2 shows the T-V and T-t curves of polymerized VA samples with an applied voltage during UV exposure. In FIG. 2a the curves with filled squares, circles and triangles represent the normal VA, 0.2% polymerized VA and 1% polymerized VA, respectively. Both the 0.2% and 1% samples show similar light transmittance as that of the normal VA cell. The response time for 0.2% polymer sample is slightly slower (1.6 ms) than that of the VA, while 1% sample shows significant improvement (31%) in the response time.

Figure 3:
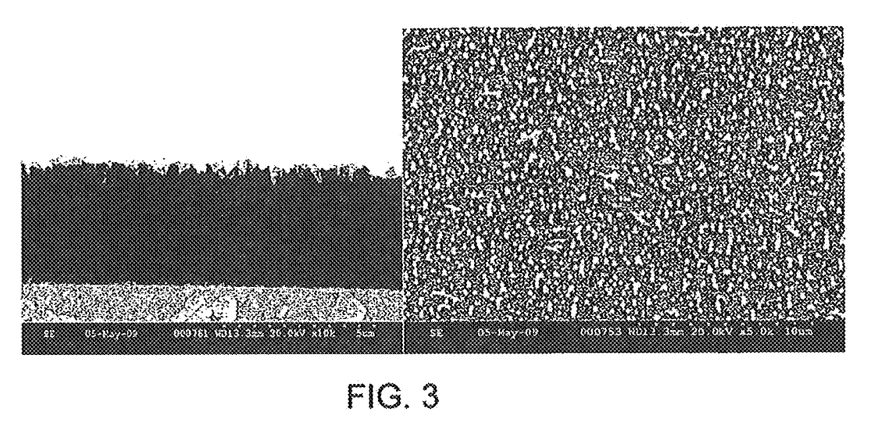
FIG. 3 shows the first picture (left panel) shows the cross-section of the polymer network grown on one surface only and including a sphere spacer on the background and the second picture (right panel) shows polymer nanorods (photo taken at a 45' angle)

FIG. 3 shows nano-scaled polymer spikes formed on both surfaces of the cell with 3% polymer. They randomly located and a few merged into islands or fibrils. The estimate size is about 140-200 nm in diameter and 130-200 nm height. Asymmetric distribution of polymer may also occur depending on the method of UV exposure as described in the experimental; for example, one surface has more nanospikes than on the other surface.

EXAMPLE 1

Double Side UV Exposure Samples

Samples were prepare by dissolving 2.99 wt. % concentration of monomer RM 257 and a small amount 0.08 at % of photoinitiator Irgacure 651 into a common liquid crystal solvent ZLI-4788-000 (Merck). This experiment was reproduced again for Sample 2' with the following composition: 2.98 wt % of RM257, 0.08 wt % of Irgacure 651 and 96.94 wt % of ZLI-4788-000. This liquid crystal has a negative dielectric anisotropy $\Delta\epsilon=-5.7$ (at 20° C., and f=1 kHz). Table 1 shows a typical composition of the mixture for preparation of SPA-VA LC cells. This liquid crystal has a negative dielectric anisotropy $\Delta\epsilon=-5.7$ (at 20° C., and f=1 kHz). To effectively induce a vertical alignment with controllable tilt angle, the monomer may consist of a mixture of a mono-polymerizable monomer with a long side chain (selected from linear or branched hydrocarbon or perfluorinated side chain with carbon number from 5 to 20) and a reactive monomer at appropriate concentration. For example, the ratio between the two monomers can be varied from 1:99 to 99:1. The solution was sandwiched between properly treated glass substrates. The glass substrates were spin-coated with a polyimide solution (Nissan Chemical SE 1211 mixed with a diluents solvent), pre-baked at 80° C. for 5 minutes then cured for one hour at 180° C., and later buffed uni-directionally to introduce a small antiparallel pre-tilt of the homeotropic boundary conditions. In order to control the cell thickness, 3.6 μm spacers were used. The spacers were sprayed on the treated glass and then assembled in a class 100 cleanroom. The cells were filled with the liquid crystal/polymer mixtures and then irradiated for 3 hours for each side at different irradiance with UV light (300 Wt Xe lamp from Oriel Instruments and portable handheld UV lamp) at room temperature (T=21° C.).

Table 1 illustrates the composition of the mixture for preparation of the SPA-VA LC cells.

TABLE 1

Composition of the mixture for preparation of SPA-VA LC cells.

| Component | Chemical structure | wt % (1, 2) | wt % (2') |
|---|---|---|---|
| ZLI-4788-000 liquid crystal | Not provided by the vendor | 96.93 | 96.94 |
| RM257 monomer |  | 2.99 | 2.98 |

TABLE 1-continued

Composition of the mixture for preparation of SPA-VA LC cells.

| Component | Chemical structure | wt % (1, 2) | wt % (2') |
|---|---|---|---|
| Irgacure 651 photoinitiator (2,2-Dimethoxy-1,2-diphenylethan-1-one) | [structure: O=C with OCH3, OCH3 and two phenyl groups] | 0.08 | 0.08 |

Sample Preparation.

Two samples were studied. Sample 1 was irradiated for 3 hours for each side of the cell at the estimated intensity of 7.2 mW/cm$^2$, using a neutral density filter. Samples 2 and 2' were irradiated using low intensity UV light (0.4 mW/cm$^2$) of 365 nm wavelength for 3 hours. The dual-irradiation process on both sides of a cell is later improved by using a reflector at the bottom of the cell.

Electrooptic Measurements.

The electro-optical properties of these cells were studied by measuring the transmittance of the cell with a He—Ne laser light. The AC voltage of 1 kHz frequency of a square wave was applied and increased at the desired rate using electro-optical measurement software developed in-house. The intensity of laser light was automatically recorded into a computer. FIG. 1 shows the transmittance curves versus applied voltage for two samples as compared to the pure ZLI-4788-000. The transmittance curve of the mixture of liquid crystal with 3% monomer was also measured and proved to be very similar to pure liquid crystal. From this plot it can clearly be seen that the threshold voltage has changed and the shapes of the curves differ.

Figure 4:
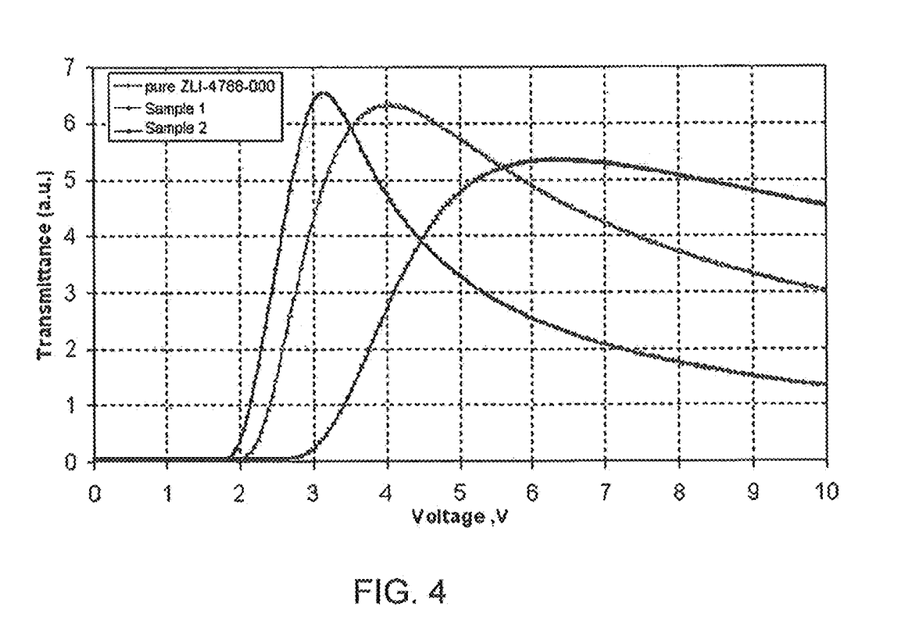
FIG. 4 shows the transmittance curves versus applied voltage for two samples as compared to the pure ZLI-4788-000.
Figure 5:
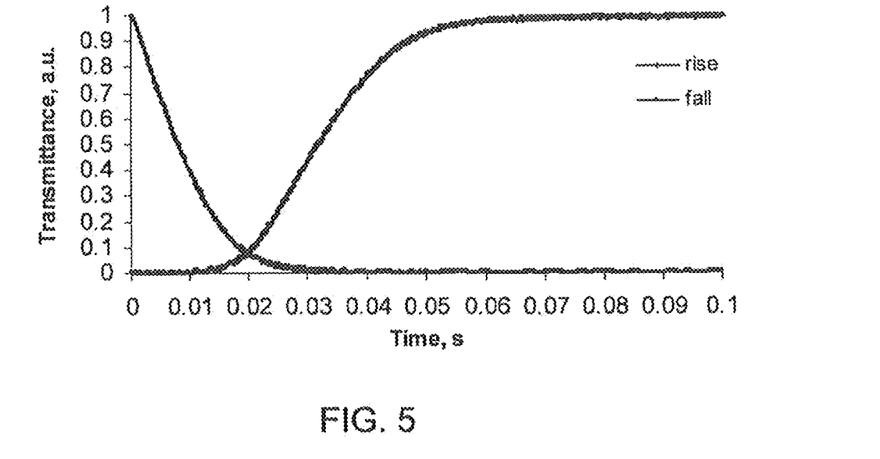
FIG. 5 shows rise and fall times for pure ZLI-4788-000 as measured by applied voltage of 0 to 3.15V and 3.15 to 0V respectively.
Figure 6:
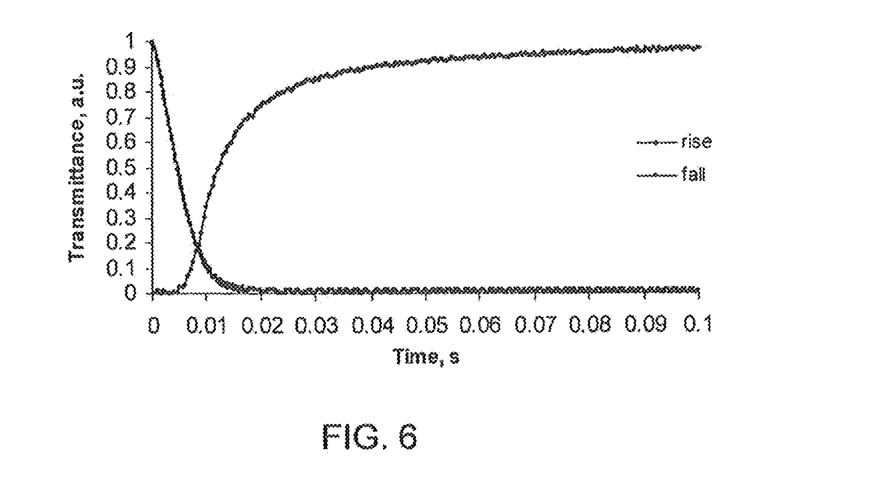
FIG. 6 shows rise and fall times for Sample 4 measured by applied voltage of 0 to 6.3V and 6.3 to 0V, respectively.

Rise and fall times were measured between 10% and 90% of the maximum transmittance of the cell. The transmittance curves versus applied voltages for the pure LC (ZLI-4788-000) and two samples are shown in FIG. 4. FIG. 5 shows the transmittance versus switching time of pure LC with applied voltage of 0 to 3.1V and 3.15 to 0V for the rise and fall times measured, respectively. The difference in rise and fall times of pure and mixture of liquid crystal with 3% monomer is negligible. The response times for two samples were measured in similar way except FIG. 6 shows the rise and fall time curves of sample 2 measured by applied voltage of 0 to 6.35 V and 6.35 to 0 V, respectively.

According to Table 2, sample 1 shows a 40% improvement in response time; however, the improvements mainly arise from the reduction in rise time. Strikingly, Sample 2 shows 21% improvement in response time; however, the major contribution arises from the shortening in fall time (~44%). This experiment was reproduced as described above as Sample 2', which shows even better improvements in rise time. Measuring rise time of Sample 2', at 6.4V gives 32 ms, what shows that Samples 2 and 2' are pretty much similar. The following shows that the SPA-VA (surface polymer assisted-vertical alignment) results in a shortening of the response time range from about 20% to about 40%, depending on the surface polymer morphology. The shortening in the fall time is as high as about 45% arising from the increase in surface anchoring strength, and peak voltage is slightly increased due to the appearance of fibrils.

TABLE 2

The response times, rising and fall times, for the three samples.

| Sample | $\tau_{rise}$ (ms) | $\tau_{fall}$ (ms) | Total (ms) | Peak voltage (V) |
|---|---|---|---|---|
| ZLI-4788-000 | 36 | 16 | 52 | 3.2 |
| 1 | 16 | 15 | 31 | 4 |
| 2 | 32 | 9 | 41 | 6.4 |
| 2' | 27 | 9 | 36 | 6.6 |

Morphology Study.

Morphologies of the samples were studied using SEM to show that different electro-optical properties of the cells are caused by different polymer structures formed at the surface of the samples. Tilting the sample at 45° permits an estimation of the size of polymer spikes. There are two contrasting results as a polymer nano-sized spikes or the rods or grow on inner surfaces of the cell as shown in FIG. 4. Sample 1, shows small spikes formed on both surfaces of the cell. They are randomly located and very rarely merged into networks. The estimate of their size is about 140-200 nm in diameter and 130-200 nm height. Sample 2 was irradiated with a low intensity UV lamp of 0.4 mW/cm$^2$. It shows the formation of the fluffy fibrillar networks on both surfaces, yet one surface has more intense networks than the others. There are not many spikes and if observed they are quite small. The appearance of fibrils depends on the phase separation conditions.

EXAMPLE 2

Single-Side UV Exposure with a Reflector

Materials and Process.

Two samples were prepared for single-side UV exposure by mixing monomer RM257, photoiniator Irgacure 651 and liquid crystal ZLI-4788-000 at the ratios of 0.2%/0.03%/99.77% and 1.0%/0.05%/98.95%, respectively. These materials were mixed by adding a few drops of organic solvent dichloromethane to dissolve the solid, and the solvent was subsequently evaporated under a stream of nitrogen gas and house vacuum to remove the residual solvent. The mixture was loaded into cells by which the glass substrates were spin-coated with a polyimide solution (Nissan Chemical SE 1211), pre-baked at 80° C. for 5 minutes then cured for one hour at 180° C., and later buffed uni-directionally to introduce a small antiparallel pretilt of the homeotropic boundary conditions. Glass bead spacers were sprayed between the substrates to maintain uniform cell gaps of 3.5 and 3.6 micron. The cells were filled with the liquid crystal/polymer mixtures and then exposed to a hand-held UV light source (365 nm, 0.4 mW) for 3 hours from one side with a piece of aluminum foil at the reverse side and at room temperature (t=21° C.) with no voltage applied.

Figure 7:
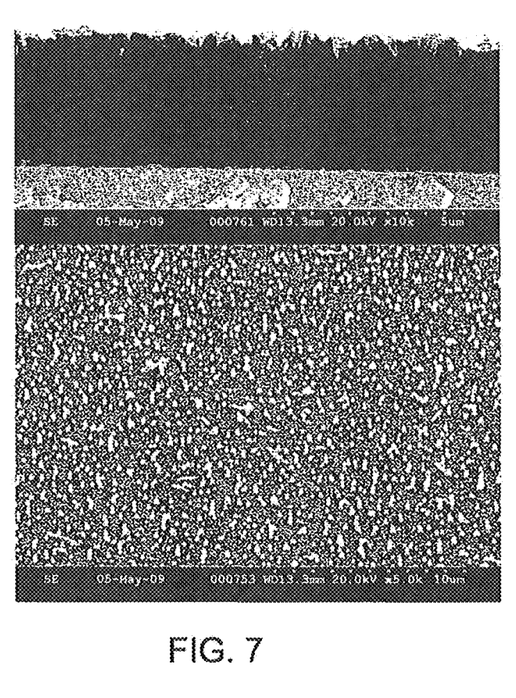
FIG. 7 shows nano-scaled polymer spikes formed on both surfaces of the cell with 3% polymer.

FIG. 7 shows the transmission versus applied voltage and the transmission versus switching time of the two single-side UV exposure SPA-VA sample cells. The threshold voltage in FIG. 5a for the cell with 0.2% polymer (3.6 μm) is 2.00V and for the cell with 1.0% polymer (3.5 μm) is 2.28 (V). The increase in threshold voltage of the SPA-VA cell is due to the increase in surface anchoring resulted from the increase in polymer density at the substrate surfaces. The $V_{90}$ (voltage of 90% transmission) voltages for the 0.2% and 1.0% SPA-VA cells are 2.8 and 3.9V, respective; while the difference in maximum light transmission for the two SPA-VA cells is negligible. To study the response times, the cells were switched between 0 and 3.03 volts for 0.2% cell and 0 and 4.0 volts for 1% cell. FIG. 5b shows the switching times of the two SPA-VA cells. The rise (RI) and decay (DE) times for cell with 0.2% polymer are 30.9 and 18 ms (total response time is 49.9 ms), respectively. In the case of cell with 1% polymer, the rise and decay times are 13.2 and 13.9 (total response time is 27.1 ms), respectively. Evidently, SPA-VA cell with 1% polymer shows high transmission, low switching voltage and fast switching compared to those of SPA-VA cells with 3% polymer.

EXAMPLE 3

Dual UV Lamps Exposure

Materials and Process.

Two samples were prepared for single-side UV exposure by mixing monomer RM257, photoiniator Irgacure 651 and liquid crystal ZLI-4788-000 at the ratios of 0.2%/0.03%/99.77% and 1.0%/0.05%/98.95%, respective. These materials were mixed by adding a few drops of organic solvent dichloromethane to dissolve the solid, and the solvent was subsequently evaporated under a stream of nitrogen gas and house vacuum to remove the residual solvent. The mixture was loaded into cells by which the glass substrates were spin-coated with a polyimide solution (Nissan Chemical SE 1211), pre-baked at 80° C. for 5 minutes then cured for one hour at 180° C., and later buffed uni-directionally to introduce a small antiparallel pretilt of the homeotropic boundary conditions. Glass bead spacers were sprayed between the substrates to maintain uniform cell gaps of 3.5 and 3.6 micron. The cells were filled with the liquid crystal/polymer mixtures and then exposed to two hand-held UV light sources (365 nm, 0.4 mW) for 3 hours from both side simultaneously at room temperature (t=21° C.) and no voltage applied.

Figure 8A:
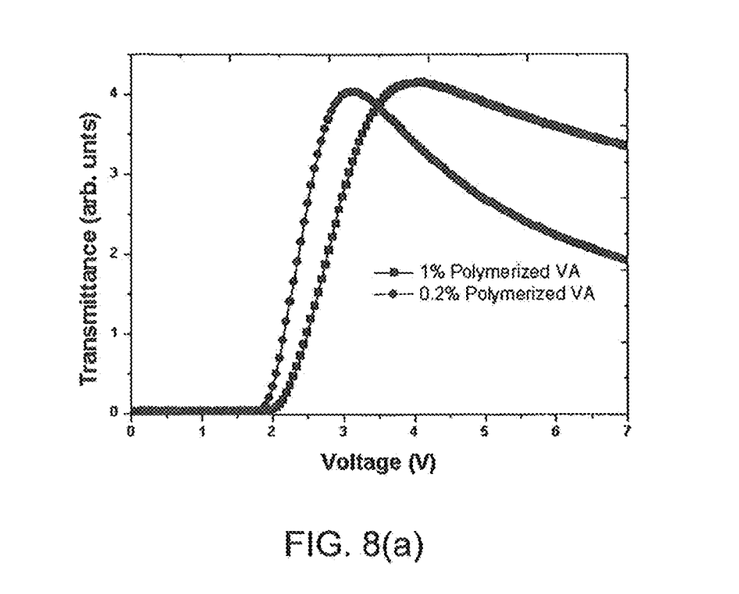
FIGS. 8(a) and 8(b) show the transmission versus applied voltage and the transmission versus switching time of the two single-side UV exposure SPA-VA sample cells.
Figure 8B:
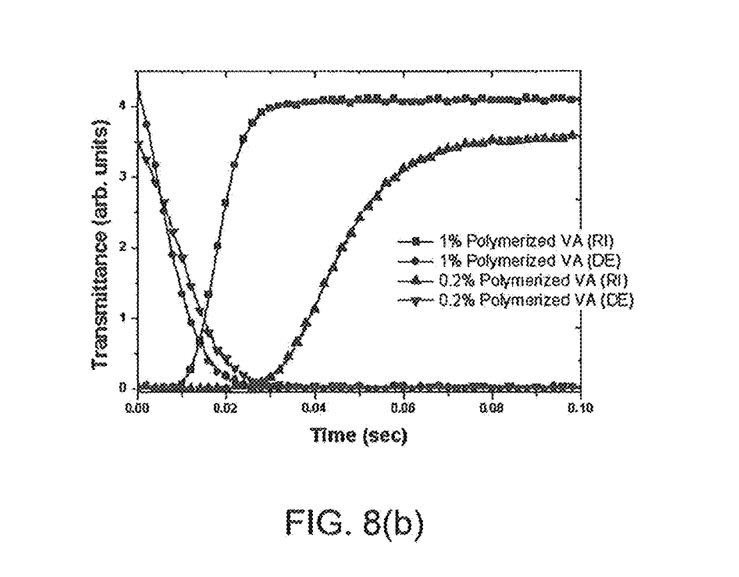
Figure 9A:
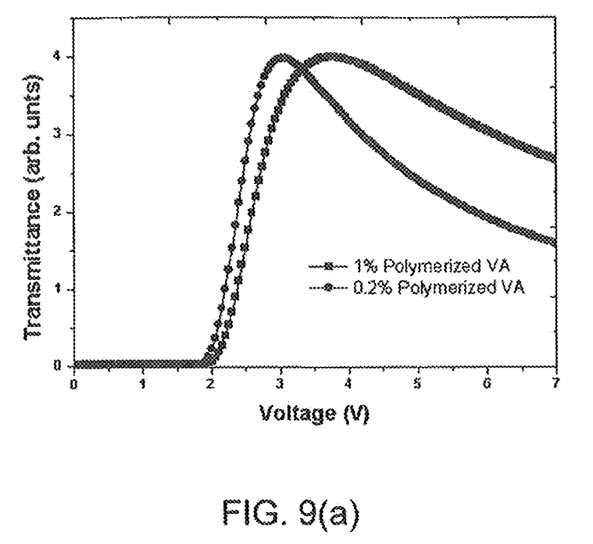
FIG. 9 shows the transmission versus applied voltage and the transmission versus switching time of the two single-side UV exposure SPA-VA sample cells.
Figure 9B:
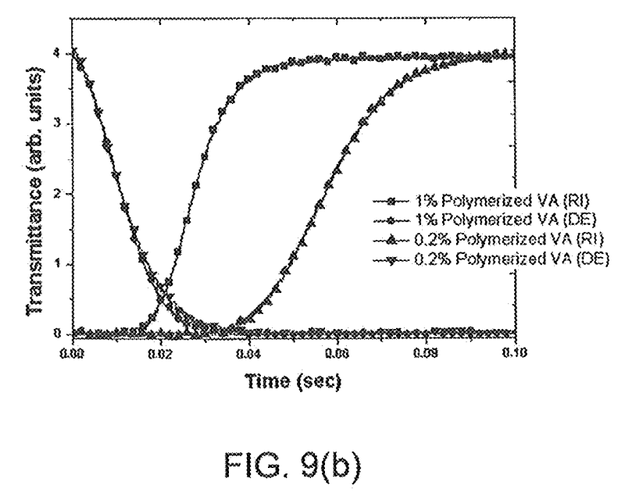

FIG. 8 shows the transmission versus applied voltage and the transmission versus switching time of the two single-side UV exposure SPA-VA sample cells. The threshold voltage in FIG. 6a for the cell with 0.2% polymer (cell gap=3.6 μm) is 2.07V and for the cell with 1.0% polymer (cell gap=3.5 μm) is 2.21 (V). The increase in threshold voltage of the SPA-VA cell is due to the increase in surface anchoring resulted from the increase in polymer density at the substrate surfaces. The $V_{90}$ (voltage of 90% transmission) voltages for the 0.2% and 1.0% SPA-VA cells are 2.68 and 3.20V, respectively; while the difference in maximum light transmission for the two SPA-VA cells is negligible. To study the response times, the cells were switched between 0 and 2.9 volts for 0.2% cell and 0 and 3.75 volts for 1% cell. FIG. 8b shows the switching times of the two SPA-VA cells. The rise (RI) and decay (DE) times for cell with 0.2% polymer are 31.9 and 20.1 ms (total response time is 52.0 ms), respectively. In the case of cell with 1% polymer, the rise and decay times are 20.1 and 17.3 (total response time is 37.4 ms), respectively. Evidently, SPA-VA cell with 1% polymer shows high transmission, low switching voltage and fast switching compared to those of SPA-VA cells with 3% polymer.

EXAMPLE 4

Single UV Exposure with Applied Electric Field

Materials and Process.

Two samples were prepared for single-side UV exposure by mixing monomer RM257, photoiniator Irgacure 651 and liquid crystal ZLI-4788-000 at the ratios of 0.2%/0.03%/99.77% and 1.0%/0.05%/98.95%, respectively. These materials were mixed by adding a few drops of organic solvent dichloromethane to dissolve the solid, and the solvent was subsequently evaporated under a stream of nitrogen gas and house vacuum to remove the residual solvent. The mixture was loaded into cells by which the glass substrates were spin-coated with a polyimide solution (Nissan Chemical SE 1211), pre-baked at 80° C. for 5 minutes then cured for one hour at 180° C., and later buffed uni-directionally to introduce a small antiparallel pretilt of the homeotropic boundary conditions. Glass bead spacers were sprayed between the substrates to maintain uniform cell gaps of 3.5 and 3.6 micron. The cells were filled with the liquid crystal/polymer mixtures and then exposed to two hand-held UV light sources (365 nm, 0.4 mW) for 3 hours from both side simultaneously at room temperature (t=21° C.) and no voltage applied.

Fast switching surface-polymer-assisted VA displays have been demonstrated. The morphological study reveals polymer nanospikes formed on the substrate surfaces, which have been shown to enhance surface anchoring. This improves switching time, and concentration of the alignment polymer increases light transmission Significant improvements in response time have been achieved through the control of density of nanospikes, which give rise to the enhancement in liquid crystal surface anchoring. The polymerized VA cells with an applied electric field also show fast switching and high transmittance with negligible increase in switching voltage. Further in accordance with the invention, cells shined under high intensity UV light grew dense polymer domains and scattered more light. Random polymer fibers increase light scattering and slow the response time. Electro-optical properties are polymer morphology dependent, with high density surface localized polymer nanospikes and fibers increasing rising time, and high polymer concentration increasing surface anchoring. The alignment effect is proportional to the surfaces and surface area of the bulk polymer network. Higher polymer concentration affords stronger alignment effect and larger lateral size of polymer network affords stronger alignment effect.

Polymer networks can be used to stabilize the liquid crystals of the surface-polymer-assisted vertically aligned (SPA-VA) liquid crystal cell of the present invention, A small amount of a reactive monomer (RM from Merck for forming a polymer network) with appropriate functionality (mixture of monofunctional and multifunctional monomer ranging from about 1.01 to about 3.0 as the ratio of polymerizable group to the weight ratio of the monomer) for photopolymerization ranging from about 0.2 to about 5.0%, preferably from about 0.2 to about 3%, more preferably from about 0.5 to about 2.0%, and most preferably from about 0.8 to about 1.5% or even about 1%, by total weight (i.e. the weight of reactive monomer, liquid crystal and photoinitiator) is combined with a nematic liquid crystal, and a small amount of photoinitiator ranging from about 0.005% to about 2%, preferably from about 0.01 to about 0.5%, and about 0.05 to about 0.2% of the total weight. The reactive monomer and photoinitiator are mixed with the liquid crystal directly, optionally with a solvent such as a few drops of organic solvent dichloromethane to dissolve the solid, and the solvent was subsequently evaporated under a stream of nitrogen gas and house vacuum to remove the residual solvent, After evaporating solvent under reduced pressure, the mixture is mixed by shaking on a vortex mixer or in an ultrasonic cleaner bath for about half an hour at room temperature. The mixture is filled into an electro-optical cell. The polymer networks are formed by placing an LC cell containing the SPA-VA mixture under the ultraviolet (UV) light exposure for a length range from 1 to 30 minutes, depending on the wavelength and intensity of the light source to form a polymer-stabilized SPA-VA sample. Preferably, the UV light is a low intensity lamp having an intensity of from 0.05 to 2 mW cm$^2$, preferably from 0.1 to 1 mW/cm$^2$, and most preferably from 0.2 to 2 mW/cm$^2$. The cell is preferably irradiated on both sides, either through direct exposure on two sides using two sources or by use of a reflective surface, such as a mirror to cause irradiation of the second side. The time of exposure is sufficient to cause the formation of nanospikes, nanorods, or nanofibrils having a diameter of from about 50 to about 1,000 nm, preferably from about 75 to about 500 nm, and most preferably from about 100 to 200 nm, and to have a similar height projecting from the surface or base of the polymer alignment layer. The polymerization can be conducted with or without an applied voltage, but preferably without. By nanospike it is meant a projection that has a length that is at least half the diameter of its width, and preferably at least the same as its width. By nanorod, it is meant a projection that may include a somewhat heftier diameter, but which still projects from the surface, including having a linear or crystalline appearance, and by nanofibril, it is meant a projection which may be more delicate, and which may include a more amorphous distal end.

The vertical alignment surface of the present invention is confined to the surface of the liquid crystal cell, and amounts and conditions are selected to avoid the penetration of the vertical alignment layer into the bulk of the cell so that the layer does not extend more than about 0.01 of the way into the cell, and preferably not more than about 0.001 into the height of the cell.

The surface-polymer-assisted vertically aligned (SPA-VA) liquid crystal cell of the present invention can be utilized in electro-optical devices. In various embodiments, the devices generally include a pair of substrates, preferably planar and disposed parallel to each other in one embodiment. The substrates are maintained at a desired distance by a suitable spacer. An electrode layer can be present on one or more of the substrates. The surface-polymer-assisted vertically aligned (SPA-VA) liquid crystal cell composition is present between the substrates.

Various materials can be utilized as a substrate, such as glass, quartz, metal foil, paper, fabric or plastic, with glass being preferred. The substrates can be planar or can be curved. In various embodiments the substrates are transparent or substantially transparent where optical transmission is important.

The electrode layers can be deposited upon a substrate by any known means or methods. In one embodiment, the electrode layer material is a substantially transparent conductive material. Examples of suitable materials include metal oxides such as indium tin oxide and indium zinc oxide, carbon nanotubes, graphene, conductive polymer and preferably is Indium tin oxide The surface-polymer-assisted vertically aligned (SPA-VA) liquid crystal cell can be utilized in numerous applications, for example electro-optical devices that can benefit from these liquid crystal compositions including electrically driven liquid crystal spatial light modulators, lenses, lens array, photonic crystal fibers, active optical elements and displays.

While in accordance with the patent statutes the best mode and preferred embodiment have been set forth, the scope of the invention is not intended to be limited thereto, but only by the scope of the attached claims.

What is claimed is:

1. A surface-polymer-assisted vertically aligned (SPA-VA) liquid crystal cell, comprising:
   at least two substrates spaced apart from each other, each having an inner surface;
   an electrode material deposited on each said substrate inner surface; a coating comprising polyimide coated on said electrode material; said SPA-VA liquid crystal cell comprising a mixture of a polymer and a negative dielectric anisotropy liquid crystal consisting essentially of a nematic liquid crystal; said polymer formed insitu on each said polyimide inner surface and does not penetrate into the bulk of the cell, said polymer forming nanospikes or nanorods that are located on said polyimide inner surface, said nanospikes or nanorods having a diameter of from about 50 to about 1,000 nm and a height of from about 50 to about 1,000 nm;
   said polymer derived from a polymerized mixture of a monofunctional monomer having a long side chain that is either a linear or branched hydrocarbon that may be perfluorinated having from 5 to 20 carbon atoms, and a multifunctional reactive monomer; said polymer polymerized with no voltage applied by exposure to low intensity ultraviolet light of from 0.05 to 2 mW/cm$^2$; and
   wherein the SPA-VA liquid crystal cell is made from a mixture comprising from about 0.2 to about 5% of said monofunctional and multifunctional reactive monomers, from about 0.005 to about 2% of a photoinitiator, and the remainder of 100% of said liquid crystal, based on the total weight of said monofunctional and said multifunctional reactive monomers, said photoinitiator and said liquid crystal, and wherein said multifunctional reactive monomer has the formula:

2. The liquid crystal cell as set forth in claim 1, wherein the SPA-VA liquid crystal cell is made from a mixture comprising from about 0.2 to about 5% of said monomers, from about 0.01 to about 0.5% of said photoinitiator, and the remainder of 100% of said liquid crystal, based on the total weight of said monomers, said photoinitiator and said liquid crystal.

3. The liquid crystal cell as set forth in claim 1, wherein the SPA-VA liquid crystal cell is made from a mixture comprising from about 0.2 to about 3% of said monomers, from about 0.01 to about 0.2% of said photoinitiator, and the remainder of 100% of said liquid crystal, based on the total weight of said monomers, said photoinitiator and said liquid crystal, and
   wherein said nanospikes or nanorods have a diameter of from about 75 nm to about 500 nm and a height of from about 75 nm to about 500 nm.

4. The liquid crystal cell as set forth in claim 3, wherein the nanospikes or nanorods have a diameter of from 100 to 200 nm, and a height of from 100 to 200 nm.

5. The liquid crystal cell as set forth in claim 3, wherein the nanospikes or nanorods have a diameter of from about 100 to about 200 nm, and a height of from about 100 to about 200 nm, and wherein said electrode material is indium tin oxide.

6. The liquid crystal cell as set forth in claim 3, wherein said monofunctional monomer long side chain is said branched hydrocarbon.

7. The liquid crystal cell as set forth in claim 6, wherein the polymerization is initiated on said cell substrates.

8. A method of making a surface-polymer-assisted vertically aligned (SPA-VA) liquid crystal cell comprising:
at least two substrates spaced apart from each other, each having an inner surface; depositing an electrode material on each said inner surface; coating said electrode material with a polymer comprising a polyimide;
forming a mixture of from about 0.2 to about 5% by weight of a multifunctional reactive monomer and a monofunctional monomer having a long side chain that is either a linear or branched hydrocarbon that may be perfluorinated having 5 to 20 carbon atoms, from about 0.005 to about 2% of a photoinitiator, and the remainder of 100% of a liquid crystal consisting essentially of a nematic liquid crystal having negative dielectric anisotropy, the percentages being by weight based on the total weight of said monomers, said photoinitiator, and said liquid crystal,
adding said mixture to said SPA-VA cell, and
exposing at least one of said cell substrate surfaces to ultraviolet light having an intensity of from 0.05 to 2 mW/cm$^2$ in the absence of an applied voltage and forming a desired pretilt angle during polymerization via ultraviolet light exposure whereby polymer nanospikes or nanorods are formed on said inner surfaces by insitu polymerization of said mixture and do not penetrate into the bulk of the cell, said nanospikes or nanorods having a diameter of from about 50 nm to about 1,000 nm and a height of from about 50 nm to about 1,000 nm; and wherein said multifunctional reactive monomer has the formula:

9. The method as set forth in claim 8, wherein a reflector is used to expose one of said cell substrate surfaces to said ultraviolet light.

10. The method as set forth in claim 9, wherein ultraviolet light exposure time is from 1 to 30 minutes.

11. The method set forth in claim 9, wherein said mixture comprises from about 0.2 to about 5% of said monomers, from about 0.01 to about 0.5% of said photoinitiator, and the remainder of 100% of said liquid crystal, based on the total weight of said monomers, said photoinitiator and said liquid crystal.

12. The method as set forth in claim 9, wherein said mixture comprises from about 0.5 to about 3% of said monomers, from about 0.01 to about 0.2% of said photoinitiator, and the remainder of 100% of said liquid crystal, based on the total weight of said monomers, said photoinitiator and said liquid crystal.

13. The method as set forth in claim 12, wherein the nanospikes or nanorods have a diameter of from 75 nm to 500 nm, and a height of from 75 nm to 500 nm.

14. The method as set forth in claim 13, wherein the nanospikes or nanorods have a diameter of from about 100 to about 200 nm, and a height of from about 100 to about 200 nm.

15. The method as set forth in claim 14, wherein the polymerization is initiated on both said cell substrates surfaces by ultraviolet light exposure.

* * * * *